United States Patent
Glassman et al.

(10) Patent No.: US 7,421,733 B2
(45) Date of Patent: Sep. 2, 2008

(54) SYSTEM AND METHOD FOR PROVIDING MULTI-CLASS PROCESSING OF LOGIN REQUESTS

(75) Inventors: Steven Charles Glassman, Mountain View, CA (US); Mark Steven Manasse, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 905 days.

(21) Appl. No.: 10/072,840

(22) Filed: Feb. 6, 2002

(65) Prior Publication Data

US 2003/0149900 A1    Aug. 7, 2003

(51) Int. Cl.
*H04L 9/32*     (2006.01)
*G06F 15/16*    (2006.01)
*H04L 9/00*     (2006.01)

(52) U.S. Cl. .......................... 726/6; 713/163; 713/183

(58) Field of Classification Search .................. 726/6
See application file for complete search history.

(56) References Cited

U.S. PATENT DOCUMENTS

| | | | | |
|---|---|---|---|---|
| 5,491,752 A | * | 2/1996 | Kaufman et al. | 380/30 |
| 5,559,505 A | * | 9/1996 | McNair | 340/5.28 |
| 5,907,921 A | * | 6/1999 | Rose et al. | 713/155 |
| 6,202,158 B1 | * | 3/2001 | Urano et al. | 713/201 |
| 6,304,906 B1 | * | 10/2001 | Bhatti et al. | 709/227 |
| 6,438,597 B1 | * | 8/2002 | Mosberger et al. | 709/227 |
| 6,883,095 B2 | * | 4/2005 | Sandhu et al. | 713/168 |

* cited by examiner

*Primary Examiner*—Gilberto Barron
*Assistant Examiner*—Virgil Herring (57) ABSTRACT

When a user successfully logs into an account, the user is provided with a first-class login token, which entitles the user to one or more unsuccessful login attempts without experiencing delays the user would otherwise experience. If attempts with a second-class login token or an expired first-class login token is impermissible, a subsequent login attempt is subject to delays the user would otherwise not experience. The delays minimize the effectiveness of dictionary attacks. Additionally, if the user attempts to login without a login token or an invalid login token, the login attempt is impermissible and the user is provided with a second-class login token for use in a delayed, subsequent login attempt.

8 Claims, 8 Drawing Sheets

Figure 7 global-login state table

SYSTEM AND METHOD FOR PROVIDING MULTI-CLASS PROCESSING OF LOGIN REQUESTS

BACKGROUND OF THE INVENTION

Many systems require a valid user name and password combination before granting access to a corresponding account. Unfortunately, users often pick user names and/or passwords that are guessable. More specifically, users often pick passwords that are common words or easy-to-type strings. Unauthorized attempts to access user accounts often occur, therefore, in the form of "dictionary attacks", which involve the use of a list of common words.

A simple dictionary attack exhibits a fairly distinctive fingerprint. Typically, a simple dictionary attack appears as a large number of invalid login attempts against a single account originating from a single IP address. It is fairly easy to stop the attack by disabling the account that an attacker (or attackers) is attacking or by blocking access from the IP-address.

However, more sophisticated dictionary attacks do occur. These include attacks from multiple IP addresses, "horizontal attacks" (i.e., attempting to log into multiple accounts using the same password), and "diagonal attacks" (i.e., different passwords against different accounts).

In general, the only defense against simple and sophisticated dictionary attacks is to reduce the login processing rate (i.e., the number of login attempts that can be processed over a defined period of time). Though this technique generally succeeds in its basic purpose, it leads to login-bottlenecks, which slow down valid login attempts and impose burdens on legitimate users. More specifically, account restrictions punish the victim rather than the perpetrator. If, for example, there is an attack against an account, that account gets disabled and the account user is responsible for initiating the recovery.

SUMMARY OF THE INVENTION

Using the present invention, legitimate users are identified and given preferential treatment with respect to account login attempts through the use of a login token. In particular, legitimate users are spared the inconvenience and delay associated with login-processing-rate limiting techniques.

When a user successfully logs into an account, the user is provided with a first-class login token, which entitles the user to one or more unsuccessful login attempts without experiencing delays the user would otherwise experience. If a login attempt with a second-class login token or an expired first-class login token is invalid, a subsequent login attempt is subject to delays the user would otherwise not experience. The delays minimize the effectiveness of dictionary attacks. Additionally, if the user attempts to login without a login token or with an invalid login token, the attempt is impermissible and the user is provided with a second-class login token for use in a delayed, subsequent login attempt.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
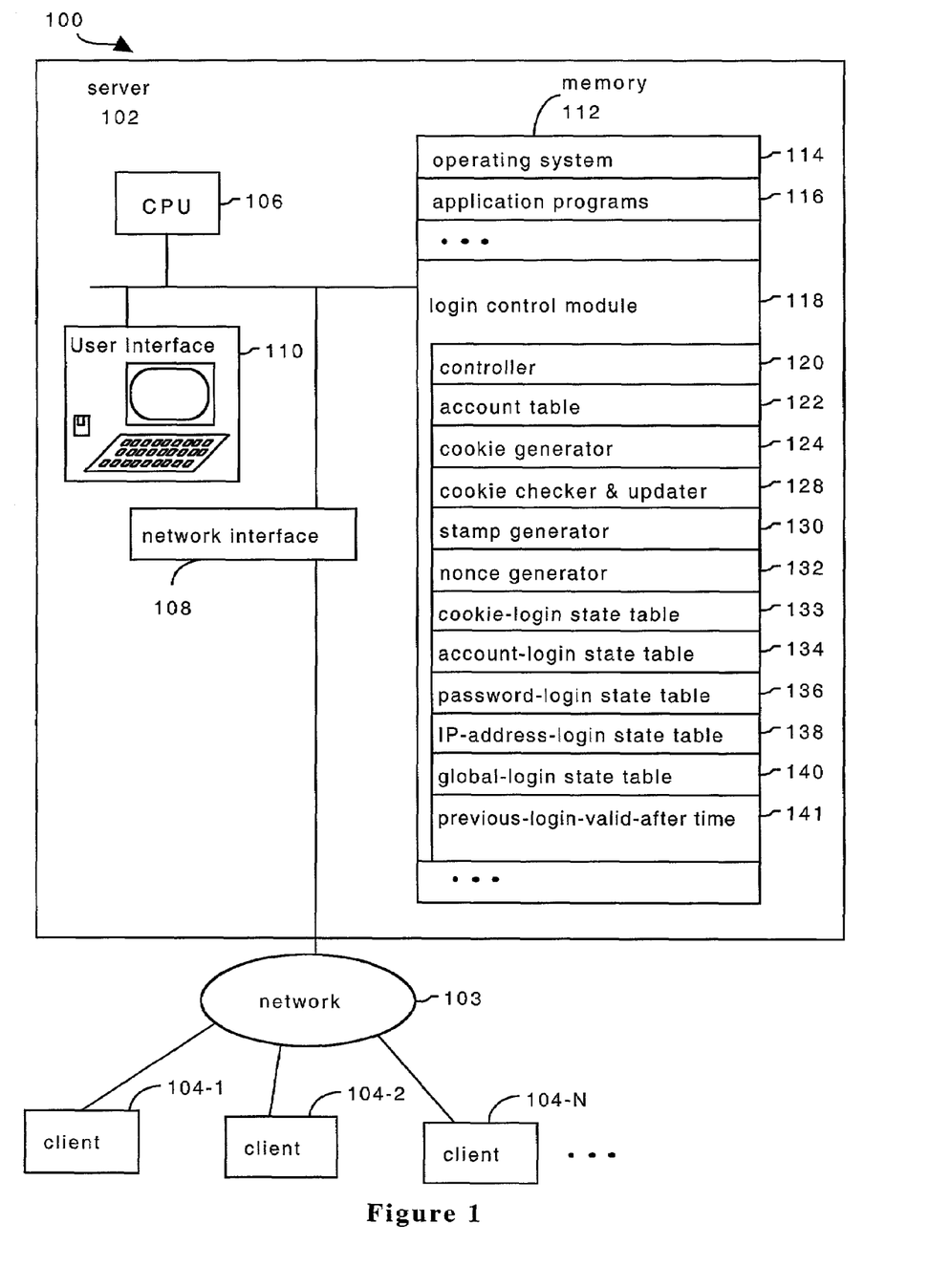
FIG. 1 is a block diagram of a server, configured to execute an embodiment of the present invention, connected to a network system.

FIG. 1 illustrates a computer system 100 consistent with the present invention. The computer system 100 includes a server 102, a computer network 103, and a plurality of clients 104. In preferred embodiments, the computer network 103 is the Internet, an Intranet, an Internet/Intranet combination, or other communications networks that link the clients 104 to a server 102. Additionally, the clients 104 are typically standard computers as described in detail below. Further, the server 102 preferably is, or operates through, a web server or other computer network interface, so that the clients 104 can access the server 102 through a computer network 103 such as the Internet.

Servers 102 consistent with an embodiment of the present invention typically include standard computer components such as one or more central processing units (CPU's) 106, a network interface 108, a user interface 110, which allows a user to operate the server 102 when necessary, and memory 112. Memory 112 typically includes high speed random access memory as well as non-volatile storage such as disk storage. The memory 112 stores items such as an operating system 114 (e.g., Windows NT®, Linux, etc.), application programs 116, and a login control module 118. The operating system 114 includes procedures for handling various basic system services and for performing hardware dependent tasks. The login control module 118 is a feature of the server 102 that is most relevant to the present invention.

The login control module 118 processes login requests received from clients 104. In a preferred embodiment, the login control module 118 includes a controller 120, an account table 122, a cookie generator 124, a cookie checker and updater 128, a nonce generator 130, a stamp generator 132, a cookie-login state table 133, an account-login state table 134, a password-login state table 136, an IP-address-login state table 138, a global-login state table 140, and a previous-login-valid-after time 141.

Figure 2:
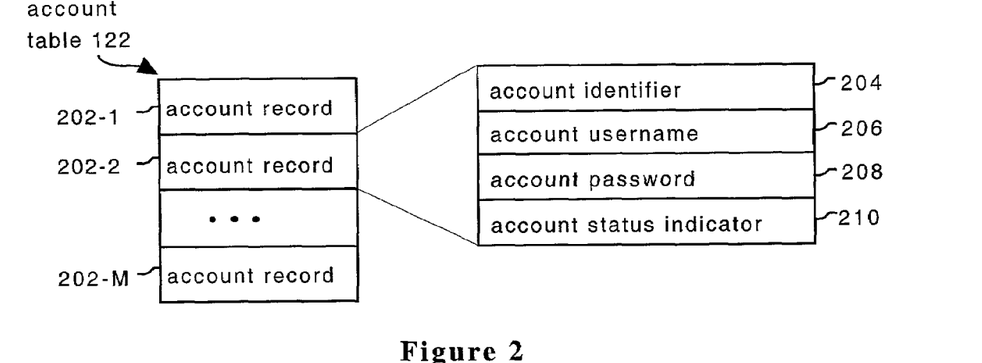
FIG. 2 is a block diagram of an account table used in an embodiment of the present invention.

The controller 120 is the core of the login control module 118 and is responsible for the actual processing of login requests. To perform this task, the controller 120 uses the other elements of the login control module 118 listed above. In particular, the controller 120 makes use of the account table 122, which, as illustrated in FIG. 2, includes account records 202 for multiple accounts. Each account record 202 includes information about an individual account recognized by the server 102. In particular, each account record 202 preferably includes an account identifier 204, an account user name 206, an account password 208, and an account status indicator 210. This information permits the controller 120 to determine whether a particular user name and password combination corresponds to a legitimate account. More specifically, when a user provides a user name and password combination, the controller 120 scans the account table 122 for a matching entry. If found, the controller 120 checks the account status indicator 210 to determine whether the account is active or otherwise accessible. Additionally, the account identifier provides a convenient means for cross referencing the account table 122 with other sources of information. Various embodiments of the present invention include additional information in the account table 122, beyond the fields shown in FIG. 2.

Figure 3A:
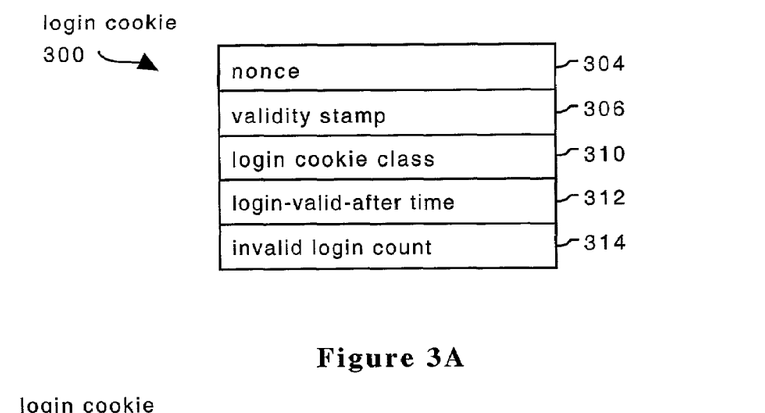
FIGS. 3A and 3B are block diagrams of a login cookie used in a preferred embodiment and an alternate embodiment of the present invention.

The cookie generator 124 is responsible for generating login cookies 300 that play an integral role in the present invention. FIG. 3A shows a specific type of login token. As noted above, the server 102 preferably is, or operates through, a web server. Accordingly, clients 104 typically interact with the login control module 118 via a web browser. Persons skilled in the art recognize that cookies, a type of file stored in computer memory, are used to maintain information related to a web site or other item accessed by a web browser. Further, it is well known that the contents of cookies are, for the most part, set by the web sites or items accessed by a browser.

Figures 3B, 4:
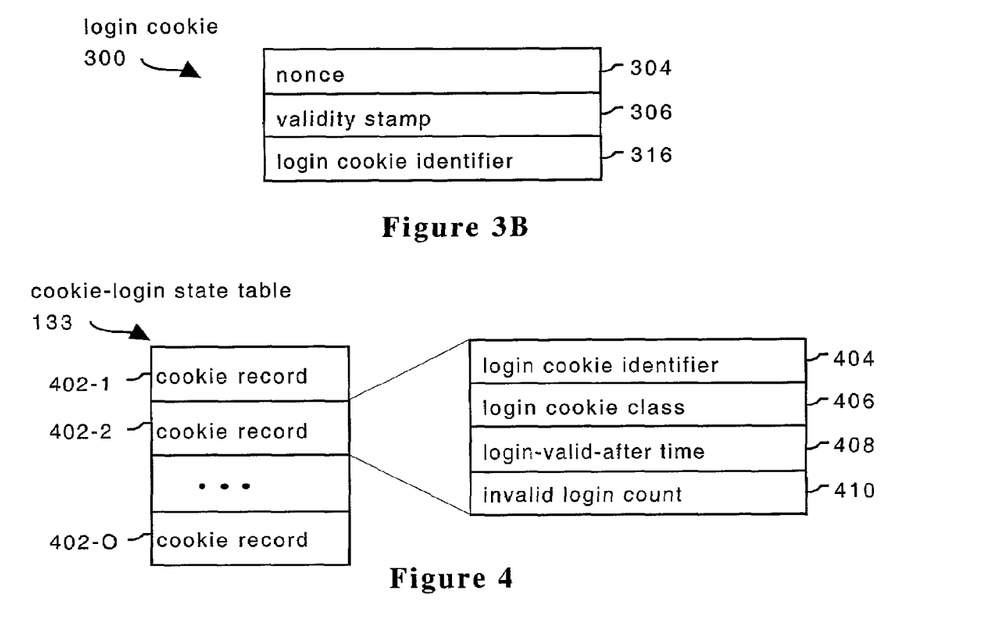
FIG. 4 is a block diagram of a cookie-login state table used in an embodiment of the present invention.

In the present invention, the login cookies 300 include information concerning attempts to log into the server 102—hence the term "login cookie". The controller 120 directs the cookie generator 124 to generate a login cookie 300, and its contents, each time the controller 120 determines that a user is attempting to login without a login cookie 300. FIG. 3A illustrates the contents of a login cookie 300 consistent with a preferred embodiment of the present invention. In particular, the login cookie 300 includes a nonce entry 304, a validity stamp entry 306, a login cookie class entry 310, a login-valid-after time entry 312, and an invalid login count entry 314. Referring to FIG. 3B, there is shown a login cookie 300 consistent with alternate embodiments of the present invention that includes an abbreviated set of fields. In these embodiments, the information included in the login cookie class entry 310, the login-valid-after time entry 312, and the invalid login count entry 314 is maintained on the server 102 in a cookie-login state table 133 as described below in connection with FIG. 4. In order to cross-reference the cookie-login state table 133, the login cookie 300 illustrated in FIG. 3B includes a login cookie identifier entry 316.

In the preferred embodiment of the present invention, the fields of the login cookie 300 are not encrypted. But in alternate embodiments of the present invention, fields 310, 312, 314 of the login cookie 300 are encrypted to prevent users from using information included in these fields to assist in attacks on the server 102. In still other embodiments of the present invention, these fields 310, 312, 314 are included in the validity stamp 306 of the login cookie 300. In these alternate embodiments, decryption of the validity stamp 306 provides not only a copy of the nonce, but also these included fields 310, 312, 314.

The nonce entry 304 stores a nonce (i.e., a random, unique string) that a user may only use one time in conjunction with a login attempt, regardless of whether the attempt is successful or unsuccessful. While processing a login attempt, a cookie updater and checker 128, under the direction of the controller 120, determines whether a user has used the nonce during a previous login attempt. If so, the controller 120 invalidates the login attempt (i.e., establishes that the login attempt is not permissible). The nonce, therefore, prevents the repeated use of an otherwise valid login cookie 300.

Under the direction of the cookie generator 124 and controller 120, a nonce generator 132 generates a nonce. As illustrated in FIG. 1, the nonce generator 132 is a software module that forms part of the login control module 118. The nonce generator may include a random number generator, or a pseudo-random number generator, that generates a sequence of numbers (i.e., nonce values) from a starting seed value.

The validity stamp stored in the validity stamp entry 306 establishes the validity of the login cookie 300 (i.e., prevents login cookie 300 forgery). The contents of the validity stamp entry 306 are, preferably, based on a secret code available only to the server 102 and generated, under the direction of the cookie generator 124 or controller 120, by a validity stamp generator 130. As illustrated in FIG. 1, the stamp generator 130 is a software module that forms part of the login control module 118. The design of the stamp generator 130 is subject to much variation without departing from the scope of the present invention so long as the stamp generator 130 is able to calculate sufficiently secure validation stamps. In one embodiment, for example, the stamp generator 130 calculates an HMAC-MD5 cryptographic checksum over contents of the cookie using a secret code available only to the server 102. By analyzing the validity stamp entry 306, the cookie checker and updater 128 determines whether the validity stamp is based on the secret code, and thus valid.

The nonce and validity stamp are, separately and together, the first line of defense against an attack. They prevent the testing of a user name and/or password against a server 102, which is necessary for successful execution of a dictionary attack. Further, computer programs generate the nonce and validity stamp, which are, therefore, not susceptible to dictionary attacks. Additionally, the use of the nonce and the validity stamp (and login cookies 300 in general) is hidden from the user.

The login cookie class entry 310 indicates the level of service accorded login attempts with a corresponding login cookie 300. In the preferred embodiment of the present invention, there are two classes of login cookies 300—first-class and second-class. A first-class login cookie 300 receives preferential treatment, preferably in the form of little or no delay between a defined number of invalid login attempts. In contrast, a second-class login cookie 300 does not receive preferential treatment. Instead, the controller 120 requires a defined amount of time between each login attempt using a second-class login cookie 300. The precise amount of time is not critical to the present invention. The present invention requires only an amount of time necessary to minimize the effectiveness of a dictionary attack. Note that some embodiments of the present invention use three or more login cookie classifications, wherein each classification defines a distinct amount of time required between each login attempt with a corresponding class of login cookie.

Further, preferred embodiments of the present invention serialize login attempts made without a first-class login cookie 300 to control the rate at which such login attempts are processed. This prevents an attacker from circumventing the login-valid-after time 312 and the previous-login-valid-after time 141 limitations (i.e., the time after which a login attempt is valid) discussed below. For example, an attacker could otherwise launch many attacks against an account in parallel and retry them in parallel just after login-valid-after times are reached.

Moreover, when a user attempts a login without a login cookie 300 or with an invalid login cookie 300, the controller does not determine the validity of the user name and password. Such attempts, therefore, do not provide information necessary for a successful dictionary attack.

As noted above, a critical distinction between a first-class login cookie 300 and a second-class login cookie 300 is the difference in the imposed delay between an invalid login attempt and a subsequent login attempt. The controller 120 uses the login-valid-after time entry 312 and a previous-login-valid-after-time 141 to enforce this distinction. Each time an invalid login attempt occurs, the controller 120 sets the login-valid-after time entry 312 by reference to the previous-login-valid-after time 141 and the current time to control when a user can validly attempt to login with a given login cookie 300. If a user/attacker subsequently executes a login attempt with a login cookie 300 before the time stored in the login-valid-after time entry 312, the controller 120 invalidates (i.e., refuses to process) the attempt before the user name and password are processed.

The previous-login-valid-after time 141 is the previous value to which a login-valid-after time 312 was set. In order to control the serialization of login attempts, the next login-valid-after time should not be less than this amount plus a predefined amount of time that is based on one or more login rates or states described herein. And in case an amount of time that exceeds this predefined amount of time lapses between invalid login attempts, the controller 120 also adds this predefined amount of time to the current time. The controller then uses the greater of the two values (i.e., the previous-login-valid-after time 141 plus the predefined amount of time and the current time plus the predefined amount of time) to set a login-valid-after time 312 and reset the previous-login-valid-after time 141.

To prevent the effective use of a first-class login cookie 300 in a dictionary attack, each first-class login token is valid for only a limited number of invalid, consecutive login attempts. The controller 120 maintains such information in the invalid login count entry 314. If the login attempt is invalid (e.g., premature login attempt, invalid user name, invalid password, etc.), the controller 120 increments the count maintained in the invalid login count entry 314. If the count subsequently equals or exceeds a predefined threshold (e.g., the invalid login count equals 5), the controller preferably changes the class of the login cookie 300 from first-class to second-class (i.e., replaces the first-class login cookie 300 with a second-class login cookie 300).

But each time a login attempt with a first-class login cookie 300 is successful, the controller 120 sets the invalid-login count to zero. Additionally, each time a login attempt with a second-class login cookie 300 is successful, the controller 120 sets the invalid-login count to zero (and the login cookie class 310 is set to "first-class"). An invalid login count of zero indicates that a user did not make any invalid login attempts with the first-class login cookie 300 since the most recent, successful login attempt.

In some embodiments of the present invention, the controller 120 links each login cookie 300 to a single account (i.e., user name). Thus, the first-class login cookie 300 that the controller 120 provides to a client 104 in response to a successful log into account A cannot be used during an attempt to log into account B. To do so, the controller 120 includes an account identifier entry in the login cookie 300 of these embodiments of the present invention. Each time a client 104 provides a login cookie 300 to the server 102 during a login attempt, the controller 120 uses the account identifier to determine whether the login cookie 300 matches the account that is the subject of the login attempt. If the login cookie 300 and the account do not match, the controller 120 treats the login attempt as though it occurred without a login cookie 300 or with an invalid login cookie 300.

Similarly, in some embodiments of the present invention, the controller 120 links each login cookie 300 to one or more additional login request attributes. For example, in these embodiments each login cookie 300 also includes an IP-address identifier entry and/or a password identifier entry. Each time a client 104 provides a login cookie 300 to the server 102 during a login attempt, the controller 120 uses the IP-address identifier and/or password identifier to determine whether the login cookie 300 matches the IP-address and/or password involved in the login attempt. If the login cookie 300 and the IP-address and/or password do not match, the controller 120 treats the login attempt as though it occurred without a login cookie 300 or with an invalid login cookie 300.

As noted above, some embodiments of the present invention use login cookies 300 with an abbreviated set of entries. The information that would otherwise be included in the login cookie 300 is maintained on the server in a cookie-login state table 133. The login cookie identifier 316 (i.e., the value stored in a login cookie identifier entry 316) provides a link to an entry 402 in the cookie-login state table 133. In a subset of these embodiments of the present invention, the controller 120 only implicitly includes a cookie identifier in the login cookie 300, by incorporating it into the calculation of the validity stamp entry 306. In this way, the cookie checker and updater 128 and controller 120 are able to extract a cookie identifier from a validity stamp after verifying the validity of a corresponding login cookie 300. For instance, if the validity stamp is an encrypted version of the nonce, the cookie identifier and perhaps other information as well (e.g., an account identifier), then decrypting the validity stamp will produce the nonce and cookie identifier. Comparing the nonce in the login cookie with the nonce produced by decrypting the validity stamp validates the login cookie, and then the cookie identifier produced by decrypting the validity stamp can be used to look up an entry in the cookie-login state table 133. In still other embodiments, the cookie identifier results from a hash of a nonce and/or validity stamp with a secret code known only to the server 102. The login cookie identifier is, therefore, explicitly or separately included in the login cookie 300, but in an encrypted form.

As indicated above, the server 102 in some embodiments of the present invention maintains information about login cookies 300 in a cookie-login state table 133 as illustrated in FIG. 4. The cookie-login state table 133 preferably includes a cookie record 402 (i.e., a table entry) for each login cookie 300 issued. The cookie records 402 preferably include a cookie identifier entry 404, a login cookie class entry 406, a login-valid-after time entry 408, and an invalid login count entry 410. Like the login cookie class entry 310 of a login cookie 300, the login cookie class entry 406 indicates the level of service accorded login attempts with a corresponding login cookie 300. Further, the login-valid-after time entry 408, like the login-valid-after time entry 312 of a login cookie 300, indicates when a user can validly attempt to login with a corresponding login cookie 300. Finally, the invalid login count entry 410, like the invalid login count entry 314 of a login cookie 300, stores a count of the number of consecutive, invalid login attempts made with a corresponding login cookie 300.

Additionally, preferred embodiments of the present invention incorporate the use of login states. A login state preferably defines the rate at which the server 102 processes login attempts made with a second-class login cookie 300 (or other non-first-class login cookies 300). In other words, a login state provides an additional means to define the amount of time required between login attempts.

The login states preferably include "normal" and "under attack." If a generally applicable login state (as described below with reference to FIG. 8) is set to "normal", second-class login cookies 300 are processed at a defined, default rate. If, however, the generally applicable login state is set to "under attack", second-class login cookies 300 are processed at a defined rate that is slower than the default rate. Dictionary attacks become less effective, therefore, because this extends the amount of time required to guess a user name and/or password.

The login state is set to "under attack" if the controller 120 detects an attack, such as a dictionary attack, against the server 102. Many techniques for detecting such attacks are known in the art. They typically involve the application of a heuristic. Preferred embodiments of the present invention maintain counts of invalid login attempts for one or more attributes of such attempts—including a login cookie 300, an IP-address, an account (i.e., user name), and/or a password. If any of the counts exceed a corresponding, defined limit, an attack may be underway. As noted above, the preferred response is to slow down the rate at which login attempts made with a second-class login cookie 300 are processed. Although the controller 120 tracks separate attributes of login attempts, the controller 120 takes the same response (i.e., slow down the rate at which second-class login cookies 300 are processed) regardless of which count indicates that an attack is underway. This uniform response, common to all invalid login attempt counts, prevents attackers from determining what actually spurred the response, and thus gain information to use in avoiding detection in the future.

With respect to a second-class login cookie 300, in some embodiments the controller 120 uses the invalid login count entry 314 to track the number of invalid login attempts executed with a specific second-class login cookie 300. If after a defined period of time, the invalid login count exceeds a defined threshold, an attack may be underway.

Figure 5:
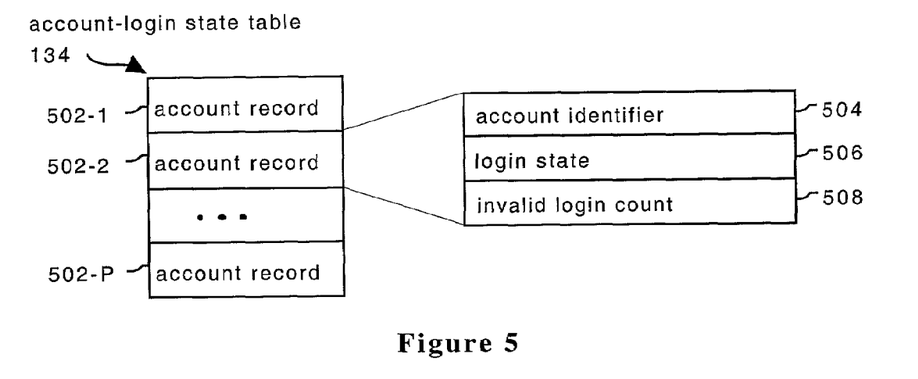
FIG. 5 is a block diagram of an account-login state table used in an embodiment of the present invention.
Figure 6:
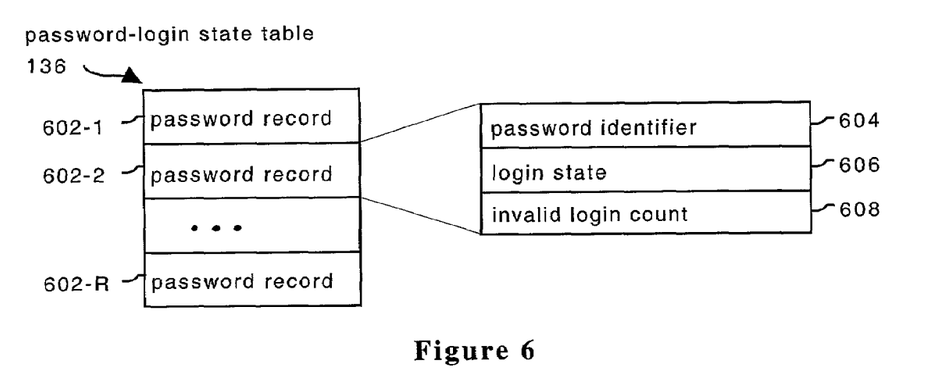
FIG. 6 is a block diagram of a password-login state table used in an embodiment of the present invention.
Figure 7:
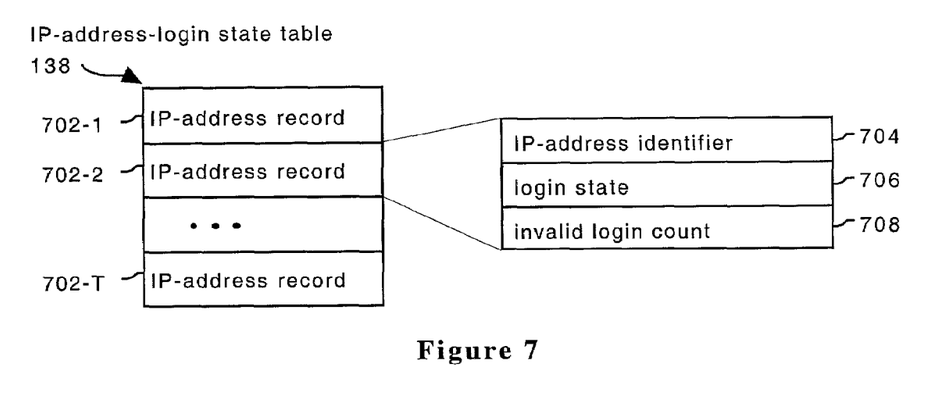
FIG. 7 is a block diagram of an IP-address-login state table used in an embodiment of the present invention.

The other attributes of the login attempt listed above (i.e., account, password, IP-address) are preferably tracked using the tables illustrated in FIGS. 5-7. In particular, FIG. 5 illustrates an account-login state table 134. This table includes P account records 502—one for each account or group of accounts recognized by the server 102. Each account record 502 includes at least an account identifier entry 504 and an invalid login count entry 508. The account identifier entry 504 provides storage for an account identifier, which, as indicated above, corresponds to one or more accounts.

The invalid login count entry 508 tracks invalid login attempts executed in connection with a given account identifier. In other words, each time an invalid login attempt uses an account associated with a given account identifier, the controller 120 increments the count maintained in the invalid login count entry 508 of a corresponding account record 502. If after the controller 120 increments the count, it equals a predefined threshold, the controller 120 responds as if an attack is underway.

As indicated above, the invalid login count entry 508 tracks invalid login attempts, so valid or successful login attempts executed in connection with a given account identifier do not affect the invalid login count entry 508 in preferred embodiments of the present invention. This aspect of these embodiments of the present invention reflects the fact that a valid user and an invalid user may attempt to login in connection with a given account identifier at roughly the same time. Resetting this count in response to a successful or valid login attempt would effectively provide the invalid user with additional login attempts before an attack is detected. Nevertheless, in alternate embodiments of the present invention, if a user successfully logs into an account associated with a given account identifier, the invalid login count entry 508 is cleared or reduced by a predefined amount.

FIG. 6 illustrates a password-login state table 136. This table includes R password records 602—one for each password or group of passwords recognized by the server 102. Each password record 602 includes at least a password identifier entry 604 and an invalid login count entry 608. The password identifier entry 604 provides storage for a password identifier, which, as indicated above, corresponds to one or more passwords.

The invalid login count entry 608 tracks invalid login attempts executed in connection with a given password identifier. In other words, each time an invalid login attempt uses a password associated with a given password identifier, the controller 120 increments the count maintained in the invalid login count entry 608 of a corresponding password record 602. If after the controller 120 increments the count, it equals a predefined threshold, the controller 120 responds as if an attack is underway.

As indicated above, the invalid login count entry 608 tracks invalid login attempts, so valid or successful login attempts executed in connection with a given password identifier do not affect the invalid login count entry 608 in preferred embodiments of the present invention. This aspect of these embodiments of the present invention reflects the fact that a valid user and an invalid user may attempt to login in connection with a given password identifier at roughly the same time. Resetting this count in response to a successful or valid login attempt would effectively provide the invalid user with additional attempts before an attack is detected. Nevertheless, in alternate embodiments of the present invention, if a user successfully logs in with a given password identifier, the invalid login count entry 608 is cleared or reduced by a predefined amount.

FIG. 7 illustrates an IP-address-login state table 138. This table includes T IP-address records 702—one for each IP-address or group of IP-addresses used to access the server 102. Each IP-address record 702 includes at least an IP-address identifier entry 704 and an invalid login count entry 708. The IP-address identifier entry 704 provides storage for an IP-address identifier, which corresponds to one or more IP-addresses.

The invalid login count entry 708 tracks invalid login attempts executed in connection with a given IP-address identifier. In other words, each time the server 102 receives an invalid-login-attempt request from an IP-address associated with a given IP-address identifier, the controller 120 increments the count maintained in the invalid login count entry 708 of a corresponding IP-address record 702. If after the controller 120 increments the count, it equals a predefined threshold, the controller 120 responds as if an attack is underway.

As indicated above, the invalid login count entry 708 tracks invalid login attempts, so valid or successful login attempts from an IP-address associated with a given IP-address identifier do not affect the invalid login count entry 708 in preferred embodiments of the present invention. This aspect of these embodiments of the present invention reflects the fact that a valid user and an invalid user may attempt to login from an IP-address associated with a given IP-address identifier at roughly the same time. Resetting this count in response to a successful or valid login attempt would effectively provide the invalid user with additional attempts before an attack is detected. Nevertheless, in alternate embodiments of the present invention, if a user successfully logs in from an IP-address associated with a given IP-address identifier, the invalid login count entry 708 is cleared or reduced by a predefined amount.

Figure 8:
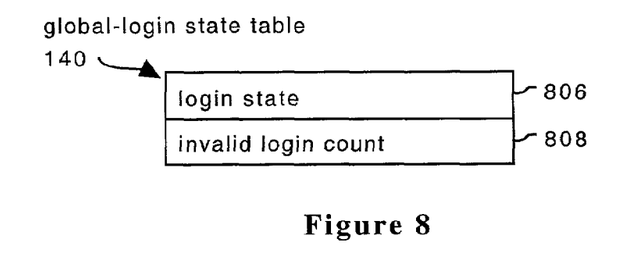
FIG. 8 is a block diagram of a global-login state table used in an embodiment of the present invention.

FIG. 8 illustrates a global-login state table 140 that is not associated with any particular attribute of an invalid login attempt. Instead, this table 140 tracks all invalid login attempts. The table includes a login state entry 806 and an invalid login count entry 808. The controller 120 preferably refers to the login state entry 806 when determining the rate at which login attempts made with a second-class login cookie 300 are processed. However, the invalid login counts maintained in the login state tables 133, 134, 136, 138, the login cookies 300, and the global-login state table 140, trigger a change in the login state maintained in the global-login state table 140.

In preferred embodiments of the present invention, the multitude of invalid login counts described above trigger a change in the login state maintained in the login state table 140 as follows: The controller 120 initializes and then periodically reduces the various invalid login counts by a predefined amount. This predefined amount reflects an acceptable number of invalid login attempts that can occur during a given period of time (i.e., a number of invalid login attempts that are not indicative of an attack). In alternate embodiments, the login counts are just set to zero. By not reducing the counts to zero, the preferred embodiment of the present invention is able to detect long term, low level attacks.

The controller 120 then increments the invalid login counts, if necessary, as described above. The controller 120 also checks the invalid login counts periodically. Preferably, the controller 120 checks the invalid login counts at a much higher rate than the rate at which the controller 120 reduces the invalid login counts by the predefined amount (or alternatively, sets the login counts to zero). If any of the invalid login counts exceed a predefined threshold, the login state entry 806 is set to "under attack". If, however, none of the invalid login counts exceed the predefined threshold, the login state entry 806 is set to "normal". Thus, any of the invalid login counts can trigger a change in the login state from "normal" to "under attack" or cause the login state to remain "under attack" regardless of which invalid login count caused the initial switch to "under attack".

The threshold of each of the various invalid login counts preferably reflects the underlying nature of the corresponding login attempt attribute. The threshold of the invalid login count maintained in the global-login state table 140, for example, should be higher than the threshold for the invalid login count maintained in the account-login state table 134. In all likelihood, the number of overall login attempts, including invalid login attempts, is greater than the number of attempts to log into a specific account. Providing a global invalid login count 808, in addition to the other types of invalid login counts, helps to detect "diagonal attacks" and other types of sophisticated attacks that are not directed against a single account or password.

As noted above, however, a given record 502, 608, 708 of a state table 134, 136, 138 is associated with more than one account, password, or IP-address, respectively, in the preferred embodiment of the present invention. In this embodiment, accounts (i.e., usernames), passwords, or IP-addresses are subjected to a hash, or other technique, configured to consistently group subsets (i.e., buckets) of the accounts, passwords, or IP-addresses respectively. The invalid login count maintained in each record 502, 608, 708, therefore, reflects the number of invalid login attempts that occur with respect to a corresponding subset or bucket of accounts, passwords, or IP-addresses. Using this aspect of these embodiments, the grouping of invalid login counts of each type can be configured to have a normalizing effect on the various thresholds such that the thresholds are actually the same.

Another benefit of associating multiple accounts, passwords, or IP-addresses with each record 502, 602, 702 in a state table 134, 136, 138 is that the invention requires less memory 110 to track the invalid login counts. Still, in some embodiments of the present invention, the number of accounts, passwords, and IP-addresses is manageable. In these embodiments, therefore, each record 502, 602, 702 in a state table 134, 136, 138 is associated with only one account, password, or IP-address.

As noted above, the various invalid login counts trigger changes in the login state maintained in the global login state table 140. The login state affects the rate at which the server 102 processes login attempts made with a second-class login cookie 300. Again, this has the effect of withholding from attackers information that they may use to avoid detection in the future.

In some embodiments of the invention, however, the various invalid login counts also, or instead, trigger changes in the login state maintained in an associated record 502, 602, 702 of a state table 134, 136, 138. In these embodiments of the invention, the various state tables 134, 136, 138 also include a login state entry 506, 706, 806 as illustrated in FIGS. 5-7. These login state entries are, preferably, set in the same fashion as the login state entry 806 of the global-login state table 140. Further, there is a one-to-one relationship between the various login states and invalid login counts maintained in the state tables 134, 136, 138.

Depending on a given embodiment, the present invention uses the login state information maintained in the state tables 134, 136, 138 in a number of ways. In one embodiment of the present invention, the login states maintained in the state tables 134, 136, 138 are a factor in the calculation of associated login-valid-after times. If a given state table record corresponds to an attribute of an invalid login attempt, the controller 120 adjusts the login-valid-after time incorporated in the second-class login cookie 300 that results from the invalid login attempt with reference to the login state maintained in the corresponding record (i.e., the login-valid-after time and the login state are associated). If, for example, a defined number of invalid login attempts take place with respect a given account, the controller 120 modifies a login state associated with the account so that, for a defined period of time, attempts to log into the account without a first-class login cookie 300 are delayed more than they would be otherwise.

In other embodiments, the controller 120 invalidates login attempts made with a second-class login cookie 300 and one or more attributes corresponding to records with a login state set to "under attack". In a sense, the controller 120 treats such a login attempt as if made without a login cookie 300. This response is not as harsh as it may seem since only login attempts with certain attributes and made with a second-class login cookie 300 are subject to this response. So as indicated above, login attempts made with first-class login cookies 300 are not subject to this response.

Thus, use of the state tables described above reduces the likelihood of success for a dictionary attack without the necessity of slowing down login attempts by one or more users with a valid first-class login cookie 300. As described more fully below, similar results are achieved with respect to passwords and IP-addresses.

Figure 9:
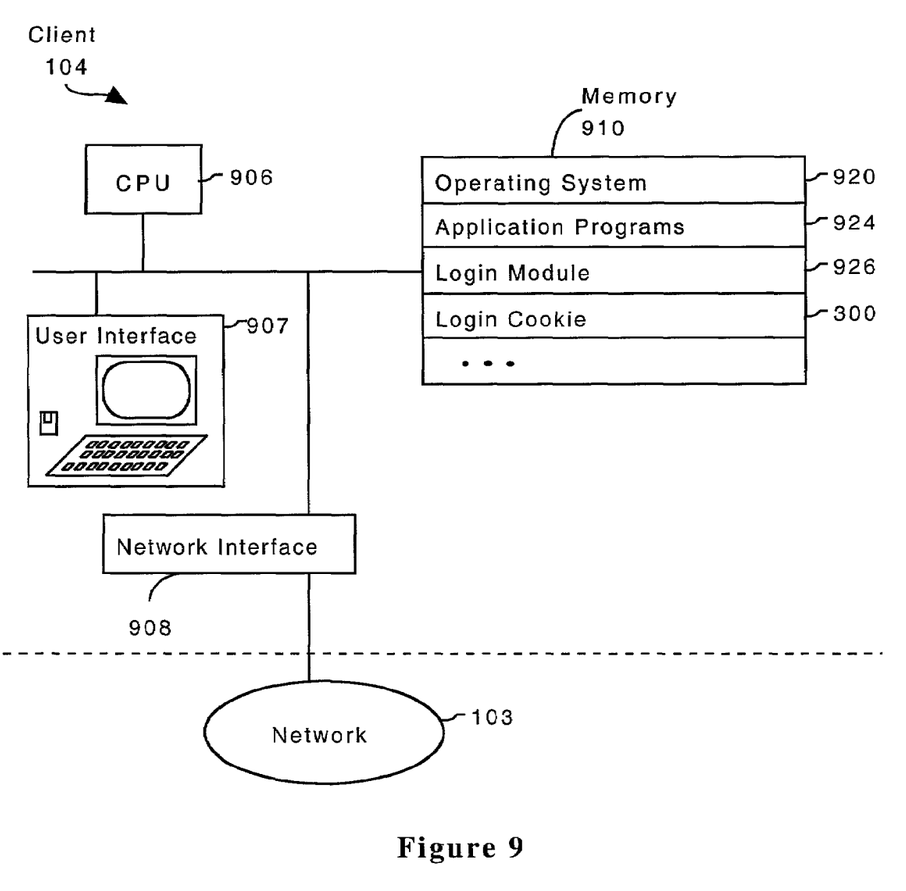
FIG. 9 is a block diagram of a client computer, configured to execute an embodiment of the present invention, connected to a network system.

FIG. 9 illustrates a client 104 consistent with the present invention. In this embodiment of the present invention, the client 104 is a essentially a standard computer including standard computer components such as a central processing unit ("CPU") 906, a network interface 908, a user interface 907, which allows a user to operate the client 104, and a memory 910. Memory 910 typically includes high speed random access memory as well as non-volatile storage such as disk storage. The memory 910 stores items such as an operating system 920 (e.g., Windows NT®, Linux, etc.), application programs 924, a login module 926, and a login cookie 300, a feature of the client 104 that is most relevant to the present invention.

The login module 926 processes login requests input at the client 104. Essentially, this entails providing visual cues through the user interface 907 to guide the user through a login process. For example, the processing may be as simple as displaying two text boxes prompting the user to enter a user name and password. The login module also transfers a login request, the login information (e.g., user name and password), and a login cookie 300 to the server 102 for processing.

As noted above, some embodiments of the server 102 are web servers so that the clients access the server 102 with a web browser 924 (a type of application program). In these embodiments, the login module 926 comprises a Java® client, HTML documents, or other software module capable of receiving text input and transferring the same to a server 102 via a network 103. In some embodiments of the present invention, the login module 926 is downloaded each time the client 104 interacts with the server 102. In other embodiments, the login module 926 is installed on the client 104 and updated only periodically. And as noted above, the server 102 provides the client 104 with login cookies 300 for use with attempts to log into an account accessible through the server 102. Accordingly, a login cookie 300 is maintained in the memory 910.

In some embodiments of the present invention, more than one login cookie 300 is stored in the memory 910 of a client 104. In these embodiments of the present invention, the login module 926 selects from the multitude of login cookies 300 based on characteristics of a particular login attempt. As noted above, in some embodiments of the present invention, the login cookie 300 includes such information as an account identifier, password identifier, and IP-address identifier (as illustrated in FIG. 3B). Thus, when an attempt is made, the login module determines which login cookie 300 to select by reference to the IP-address of the client 104, the account identified in the login request (i.e., a user name), or the password supplied. This aspect of the login module 926 provides greater flexibility in that a user can log into multiple accounts, for example, from one client 300 without the loss of a first-class login cookie 300.

Figure 10A:
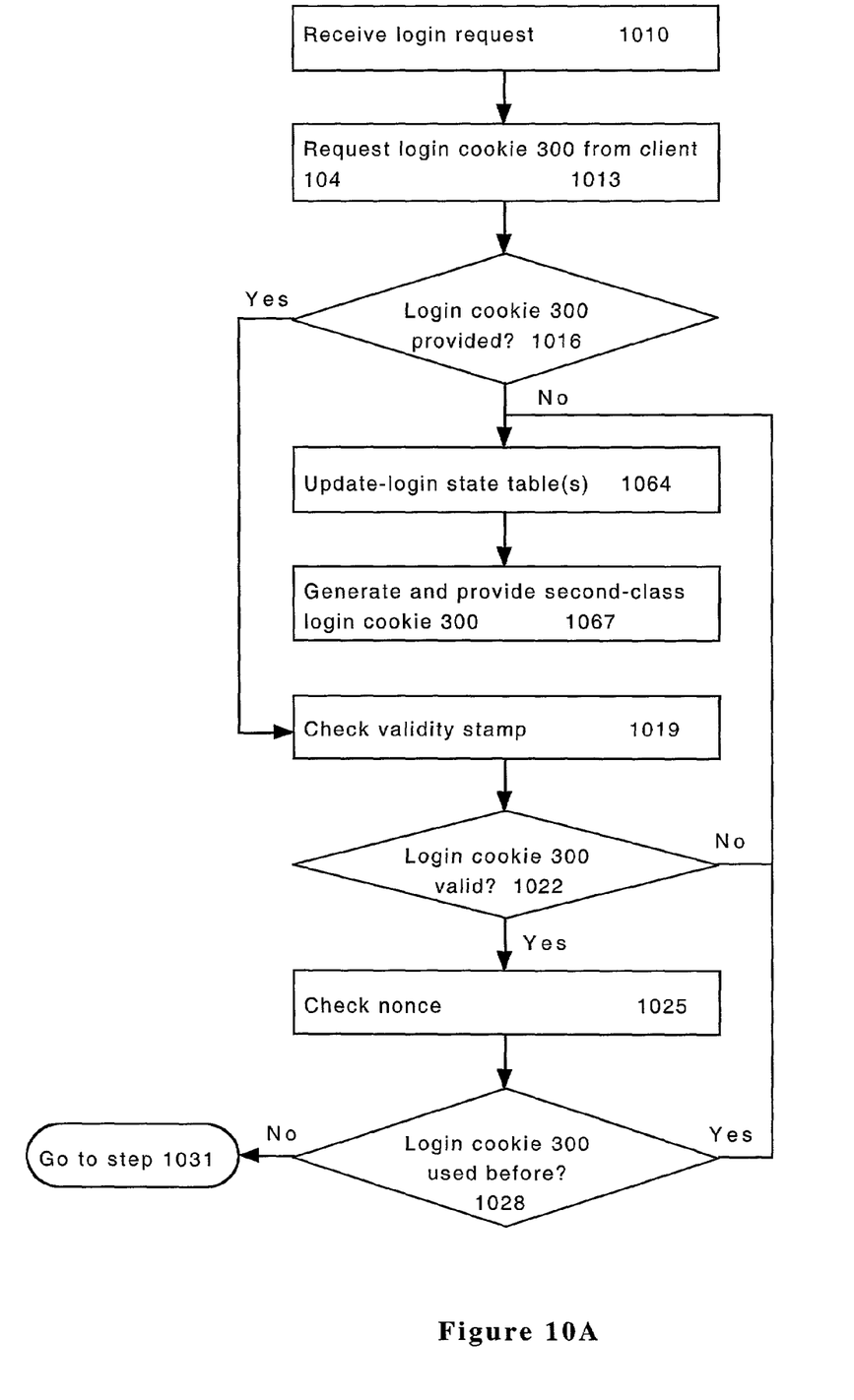
FIGS. 10A-10D illustrate steps used to process a login request in accordance with an embodiment of the present invention.
Figure 10B:
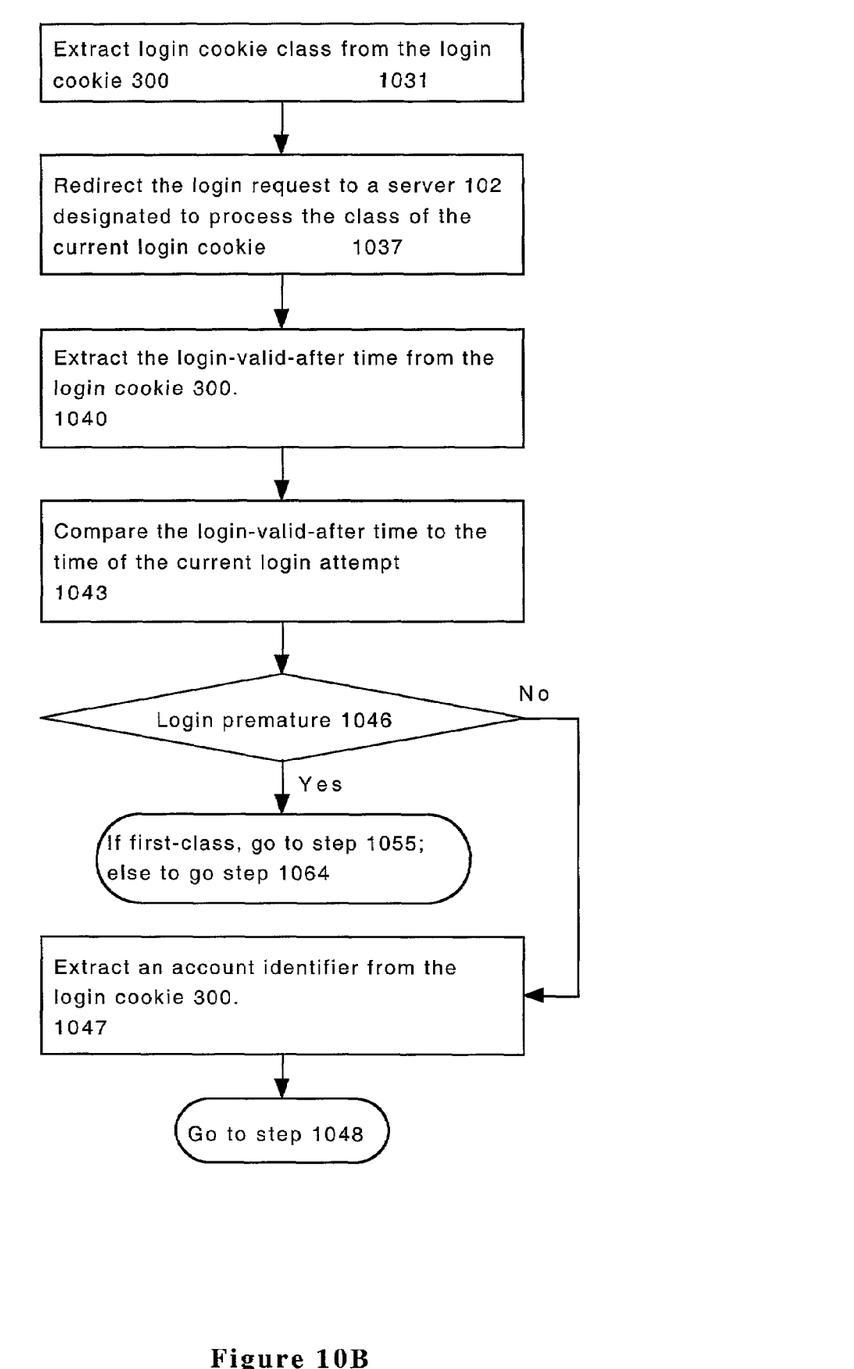
Figure 10C:
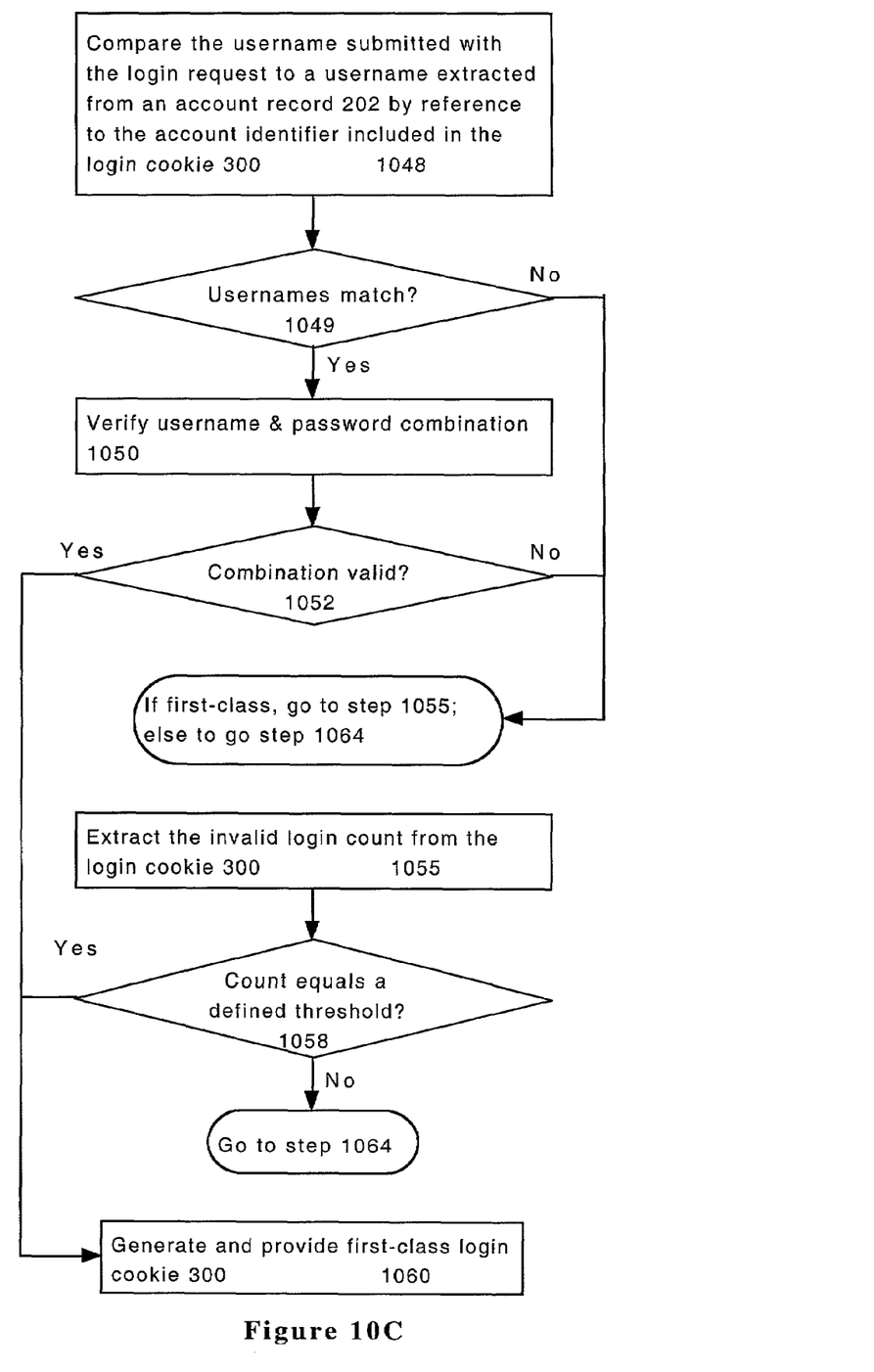

FIGS. 10A-10C illustrate steps taken by a server 102 while a login request is processed in a preferred embodiment of the present invention. In a first processing step, the controller 120 receives a login request from a client 104 (step 1010). The server responds by requesting a login cookie 300 from the client 104 (step 1013). Note that in alternate embodiments of the present invention, the client 104 provides the login cookie 300 in conjunction with the login request so that the controller 120 does not need to request the login cookie 300 separately.

If the client 104 does not provide a login cookie 300 to the server 102 during the login request (step 1016-No) the controller 120 updates one or more login state tables 134, 136, 138, 140 (step 1064). As noted above, the controller 120 may track various attributes of invalid login requests. For instance, the attributes that may be tracked include the IP-address from which the login request originates and the user name and password provided with the login request. The updating of the state tables 134, 136, 138, 140 includes incrementing an invalid login count maintained in a record of the state tables associated with the respective attributes of the invalid login.

The controller 120 also directs the cookie generator 124 to generate a login cookie 300 that the controller 120 provides to the client 104 from which the login request originated (step 1067). In alternate embodiments, the process of generating a login cookie 300 in response to a login attempt without a login cookie 300 includes creating a corresponding entry 402 in the cookie-login state table 133. Recall, in these embodiments of the present invention, information about a login cookie 300 is maintained on the server 102 instead of in the login cookie 300 itself. But in the preferred embodiment, the login cookie 300 itself maintains, for example, invalid login counts 314, a login-valid-after time 312, and a login cookie class 310 so the cookie-login state table 133 is not used.

Figure 10D:
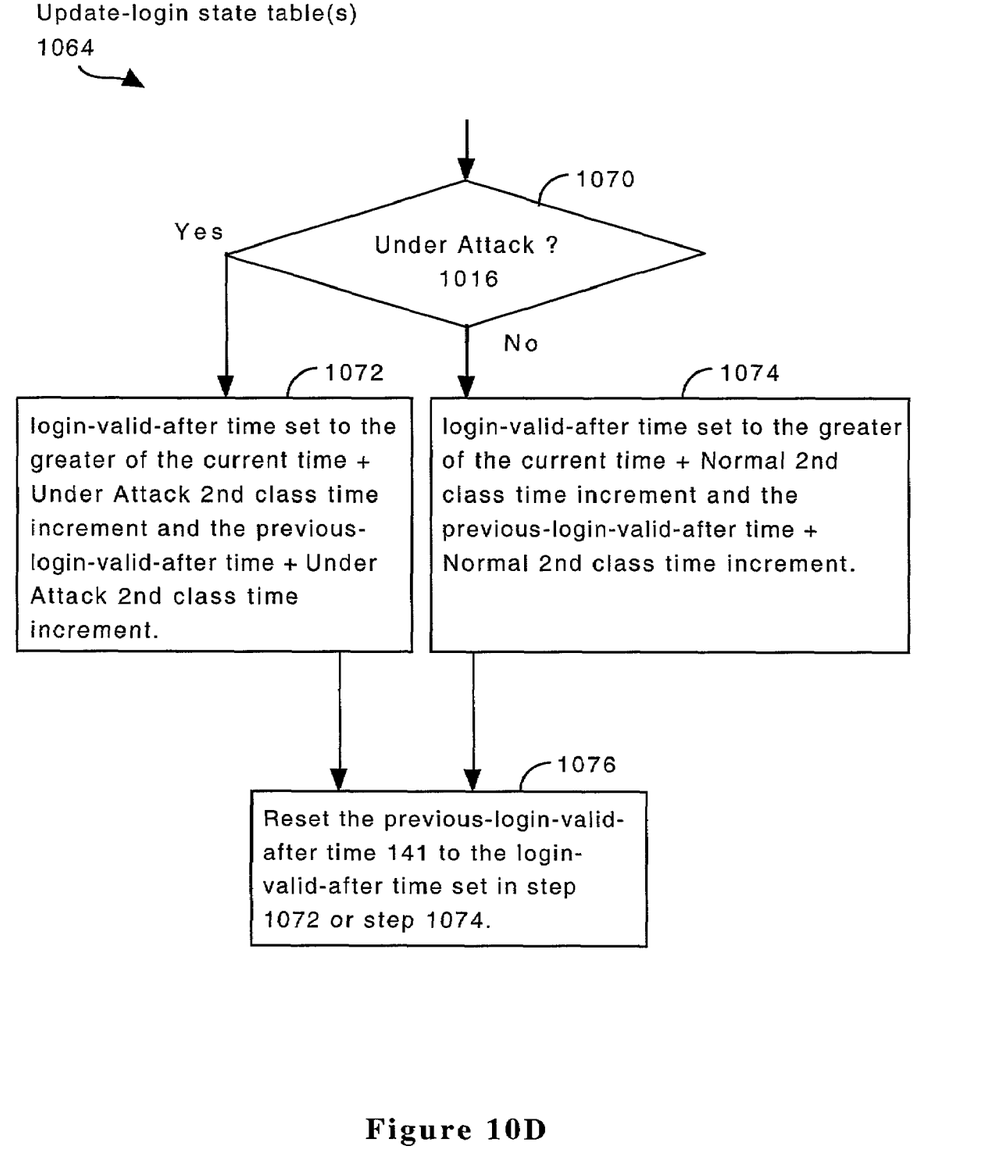

Referring to FIG. 10D, some of the sub-steps of step 1067—relating to the creation of a login-valid-after time—are shown in more detail. In particular, if the login state maintained in the global-login state table 140 is set to "under attack" (step 1070-Yes), a large time increment, called the "under attack" time increment, is separately added to the current time and the previous-login-valid-after time 141 to generate two times. The greater of the two times is then used to set the login-valid-after time 312 for the login cookie 300 (step 1072). If the controller is not under attack (step 1070-No), then a small time increment, called the "normal" increment, is added to the current time and the previous-login-valid-after time 141 to generate two times. The greater of the two times is then used to set the login-valid-after time 312 for the login cookie 300 (step 1074). The controller 120 then resets the previous-login-valid-after time 141 to the login-valid-after time selected in either step 1072 or step 1074 (step 1076).

The client 104 may then use the login cookie 300 for subsequent login attempts. And as noted above, a login attempt without a login cookie 300 never reaches the point of the login process in which the controller 120 tests the user name and password combination so that a dictionary attack cannot make progress.

If the client 104 provides a login cookie 300 during the login attempt (step 1016-Yes), the controller 120 directs the cookie updater and checker 128 to confirm the validity of the login cookie 300 as described above (step 1019). If the validity stamp included in the login cookie 300 is not valid (step 1022-No), the controller 120 executes steps 1064 and 1067 as described above in connection with a login attempt without a login cookie 300. The controller 120, therefore, preferably treats a login attempt without a valid validity stamp as a login attempt without a login cookie 300.

If, however, the validity stamp included in the login cookie 300 is valid (step 1022-Yes), the cookie updater and checker 128 checks whether the user has used a login cookie having the same nonce value during a previous login attempt (step 1025). If a user did use a login cookie having the same nonce during a previous login attempt (step 1028-Yes), this means that the user is attempting to reuse an old login cookie, and in response, the controller 120 executes steps 1064 and 1067 as described above in connection with a login attempt without a login cookie 300. The controller 120, therefore, preferably treats a login attempt made with a previously used login cookie 300 (as determined by the reuse of the nonce value in the login cookie 300) as a login attempt made without a login cookie 300. The reason for making this response to reuse of a nonce is that this suggests that a user/attacker is trying reuse an otherwise valid login cookie 300 to execute a dictionary attack.

If the controller 120 confirms that the nonce has not been used with a previous login attempt (step 1028-No), the login cookie 300 is valid. One technique that the controller 120 may use to confirm that a nonce has not been used with a previous login attempt (step 1028) is as follows. The controller 120 maintains a bit vector, each position of which corresponds to a respective nonce value, to indicate which nonce values have already been used (i.e., which nonce values are stale). The controller 120 hashes the nonce in a received login cookie 300 to generate a smaller integer, and then looks in the bit vector at a position corresponding to the integer to see if the integer (and thus the nonce) has already been used. In some embodiments, the position is an explicit part of the nonce, which makes for a very simple hash function. Once a cookie has been validated, the bit vector position corresponding to the login cookie's 300 nonce is set (i.e., set to indicate that a corresponding nonce is stale). If the nonce contains a time stamp, the controller 120 preferably uses a hash function configured so that recently-issued login cookies 300 are guaranteed to have unique positions in the bit vector (i.e., with respect to each other), while older login cookies 300 probabilistically share bit vector positions. The bit-vector is preferably given a sufficiently large length to store information about all valid login cookies 300 received over a predetermined period of time.

The controller 120 then extracts the login cookie class 310 from the login cookie 300 (step 1031). In the preferred embodiment of the present invention, the server 102 comprises a number of separate servers 102, one for each login cookie class. As noted above, there are first-class login cookies 300 and second-class login cookies 300 in the preferred embodiment of the present invention. As a result, the server 102 preferably comprises a first-class login server and a second-class login server. The first-class login server conducts the initial processing of the login request (i.e., login cookie validation, identification, and classification). With reference to the extracted login cookie class 310, the controller 120 redirects the login request to an appropriate server 102, if necessary, for further processing (step 1037). If the login cookie 300 is a first-class login cookie 300, redirection of the login attempt is not necessary.

The controller 120, operating from either the first-class login server or the second-class login server, then extracts the login-valid-after time from the login cookie 300 (step 1040). The controller 120 then compares this time to the current time (step 1043). If the login attempt is premature (i.e., the login attempt is invalid) (step 1046-Yes) and the login cookie 300 is a second-class login cookie 300, the controller 120 executes steps 1064 and 1067. The execution of step 1064 is as it is described above in connection with a login attempt without a login cookie 300. At the very least, the controller 120 increments the invalid login count maintained in the invalid login count entry 314. The controller 120 may or may not update the login-valid-after time 312. In some embodiments of the present invention, the controller 120 updates the login-valid-after time 312 after each invalid login attempt. In other embodiments, the controller 120 updates the login-valid-after time 312 only if it has passed. Further, the controller 120 directs the cookie checker and updater 128 to update the nonce entry 304.

In embodiments that use a cookie-login state table 133, the execution of step 1067 is somewhat different since the client 104 provided a valid second-class login cookie 300 during the login attempt. For example, there is no need to create a new cookie record 402. Instead, the controller 120 directs the cookie checker and updater 128 to update the current cookie record 402 corresponding to the login cookie 300 provided with the login attempt. Note that the controller 120 either replaces or updates the login cookie 300 located on the client 104. Either way, the login cookie 300 that remains after these steps corresponds to the same cookie-login state record 402 as before these steps.

If the login attempt is premature (i.e., the login attempt is invalid) (step 1046-Yes) and the login cookie 300 is a first-class login cookie 300, the controller 120 extracts the invalid login count from the login cookie 300 (step 1055).

If the count is equal to a predefined number (step 1058-Yes), the controller executes steps 1064 and 1067. The controller executes step 1064 as described above in connection with a login attempt without a login cookie 300. Specifically, the controller 120 sets the login cookie class entry 312 to "second-class", sets the login-valid-after time entry 312, resets the invalid login count 314, and updates the nonce entry 304.

If the count is less than the predefined number (step 1058-No), the controller 120 directs the generation and provision of a first-class login cookie 300 to the client 104 (step 1060). Specifically, the controller 120 increments the count in the invalid login count entry 314 and resets the login-valid-after time 312. Note that the login-valid-after time 312 is essentially the current time in the case of first-class login cookies 300. But including this information permits the controller 120 to effectively slow down all login attempts if need be. Further, the controller 120 updates the nonce entry 304.

As noted above, the controller 120 compares the login-valid-after time to the current time to determine if the login attempt is premature in step 1043. Steps taken if the login attempt is premature are described above. As noted above, some embodiments of the present invention include an account identifier entry in the login cookies 300. In these embodiments, the controller 120 extracts an account identifier from the login cookie 300 submitted with the login request (step 1047) if the login attempt is not premature (step 1046-No). The controller then compares the user name submitted with the login request to a user name extracted from an account record 202 corresponding to the extracted account identifier included in the login cookie 300 submitted with the login request (step 1048).

If the user names do not match (step 1049-No) and the login cookie 300 is a second-class login cookie 300, the controller 120 executes steps 1064 and 1067 as described above in connection with a login attempt without a login cookie 300.

If the user names match (step 1049-Yes), the controller 120 determines whether the user name and password combination provided is valid (and thus whether the login attempt is successful) (step 1050). If the user name and password combination is invalid (step 1052-No), the controller executes either step 1055 or step 1064 as described above with respect to premature login attempts.

If, however, the user name and password combination is valid (step 1052-Yes), the controller 120 generates and provides to the client 104 a first-class login cookie 300 (step 1060). Specifically, the controller 120 resets the count maintained in the invalid login count entry 314 to zero. This indicates that no invalid login attempts have taken place since the most recent valid login attempt. Additionally, the controller 120 directs the resetting of the login-valid-after time 312—preferably to the current time—and the updating of the nonce entry 304 in the login cookie 300. And if the login attempt is made with a second-class login cookie 300, the login cookie class entry 310 is set to "first-class".

While the above described steps take place, the controller 120 executes additional processes. In particular, the controller periodically checks (and resets) the various invalid login counts against predefined thresholds. And as noted above, the controller 120 preferably checks the invalid login counts at a much higher rate than the controller 120 resets (i.e., reduces by a predefined amount or sets to zero) the various invalid login counts. If the controller 120 determines that any of the invalid login counts exceed a corresponding threshold, the controller 120 sets the login state maintained in the login state entry 806 of the global-login state table 140 to "under attack". The controller 120 also directs the second-class login server 102 to slow down the rate at which the second-class login server 102 processes login attempts made with a second-class login cookie 300. Note that this step is preferably taken in addition to adjusting the calculation of login-valid-after time in connection with the login state as described above with respect to FIG. 10D.

But if none of the invalid login counts exceed the corresponding threshold, the controller 120 sets the login state maintained in the login state entry 806 of the global-login state table 140 to "normal". The controller 120 also directs the second-class login server 102 to resume processing login attempts made with a second-class login cookie 300 at a predefined default rates.

As noted above, in some embodiments of the present invention, the controller 120 maintains separate login states in conjunction with each invalid login count. The controller 120 may also, therefore, cross check the attributes of a login attempt with corresponding login states before verifying the validity of the user name and password combination submitted with the login request when processing second-class login cookies. If any of the corresponding states are set to "under attack", the controller 120 invalidates the login attempt and executes steps 1064 and 1067 as described above in connection with a login attempt without a login cookie 300. Such login attempts are, therefore, not fully processed (i.e., the controller 120 does not test user name and password combination) at least until the login state of each attribute of the login request is "normal".

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for providing multi-class processing of login requests comprising:
    associating a login cookie class with a login cookie;
    providing a level of service to login attempts associated with the login cookie based on the login cookie class of the login cookie; and
    requiring a longer time delay for a second-class login cookie than for a first-class login cookie between an invalid login attempt and allowing a subsequent login attempt.

2. The method of claim 1 wherein providing a level of service to login attempts associated with the login cookie based on the login cookie class of the login cookie further comprises:
    invalidating the subsequent login attempt for the second-class login before a user name and password are processed responsive to the subsequent login attempt being performed before the expiration of the longer time delay.

3. The method of claim 1 wherein providing a level of service to login attempts associated with the login cookie based on the login cookie class of the login cookie further comprises:
    serializing login attempts made without a login cookie designated as first-class.

4. The method of claim 1 wherein providing a level of service to login attempts associated with the login cookie based on the login cookie class of the login cookie further comprises:
    responsive to no invalid consecutive login attempts since a previous valid login, associating a different class of login cookie with a more preferential level of service with the login cookie.

5. The method of claim 1 wherein providing a level of service to login attempts associated with the login cookie based on the login cookie class of the login cookie further comprises:
    processing a login attempt associated with a class with a less preferential level of service at a slower defined rate than another class with a more preferential level of service based on a login state which defines a rate at which a server can process login attempts.

6. A computer program product for use in conjunction with a computer system, the computer program product comprising a computer readable storage medium and a computer program mechanism embedded therein, the computer program mechanism comprising:
    instructions for associating a login cookie class with a login cookie;
    instructions for providing a level of service to login attempts associated with the login cookie based on the login cookie class of the login cookie; and
    instructions requiring a longer time delay for a second-class login cookie than for a first-class login cookie between an invalid login attempt and allowing a subsequent login attempt.

7. A method for providing multi-class processing of login requests to resist unauthorized access attempts comprising:
    providing a client with a first-class login token when the client successfully logs into an account, wherein the first-class login token entitles the client to one or more unsuccessful login attempts without requiring a delay between the unsuccessful login attempts;
    requiring a delay between attempts to log into the account if a second-class login token or an expired first-class login token is utilized by the client; and
    rejecting login attempts by the client when the client does not utilize any class of login token.

8. The method of claim 7, comprising providing the client with the second-class login token for a subsequent login attempt if the client does not utilize any class of login token.

* * * * *

UNITED STATES PATENT AND TRADEMARK OFFICE
CERTIFICATE OF CORRECTION

| | | |
|---|---|---|
| PATENT NO. | : 7,421,733 B2 | Page 1 of 1 |
| APPLICATION NO. | : 10/072840 | |
| DATED | : September 2, 2008 | |
| INVENTOR(S) | : Steven Charles Glassman et al. | |

It is certified that error appears in the above-identified patent and that said Letters Patent is hereby corrected as shown below:

Title Pg, Item (56), under "U.S. Patent Documents", in column 2, line 3, delete "5,907,921  A  *  6/1999  Rose et al. ............713/155" and insert -- 5,907,621  A  *  5/1999  Bachman et al. ..........713/155 --, therefor.

Signed and Sealed this

Thirteenth Day of January, 2009

JON W. DUDAS
*Director of the United States Patent and Trademark Office*